(12) United States Patent  
Natarajan et al.

(10) Patent No.: US 12,455,764 B2  
(45) Date of Patent: Oct. 28, 2025

(54) DISTRIBUTED SCHEDULING IN CONTAINER ORCHESTRATION ENGINES

(71) Applicant: International Business Machines Corporation, Armonk, NY (US)

(72) Inventors: Senthilnathan Natarajan, Bangalore (IN); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 17/678,575

(22) Filed: Feb. 23, 2022

(65) Prior Publication Data

US 2023/0266997 A1 Aug. 24, 2023

(51) Int. Cl.
*G06F 9/48* (2006.01)
*G06F 9/50* (2006.01)

(52) U.S. Cl.
CPC .......... *G06F 9/4881* (2013.01); *G06F 9/5027* (2013.01); *G06F 2209/501* (2013.01); *G06F 2209/503* (2013.01); *G06F 2209/505* (2013.01)

(58) Field of Classification Search
CPC ................. G06F 9/4881; G06F 9/5027; G06F 2209/501; G06F 2209/503; G06F 9/505; G06F 9/5044

See application file for complete search history.

(56) References Cited

U.S. PATENT DOCUMENTS

| | | | |
|---|---|---|---|
| 9,600,523 B2* | 3/2017 | Sankar | G06F 16/24556 |
| 9,842,006 B2* | 12/2017 | Kaplinger | G06F 9/5083 |
| 9,858,166 B1* | 1/2018 | Gong | G06F 9/45558 |
| 10,592,378 B1* | 3/2020 | Tali | G06F 11/3051 |
| 10,871,998 B2 | 12/2020 | Parees et al. | |
| 10,967,274 B1* | 4/2021 | Schuster | G06F 9/5083 |
| 11,144,342 B2* | 10/2021 | Schulze | G06F 9/45558 |

(Continued)

FOREIGN PATENT DOCUMENTS

CN 112486679 A 3/2021

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Benjamin C Wu
(74) *Attorney, Agent, or Firm* — Ryan, Mason & Lewis, LLP (57) ABSTRACT

Methods, systems, and computer program products for distributed scheduling in container orchestration engines are provided herein. A computer-implemented method includes: configuring a plurality of entities of a container-based computing environment to perform a distributed scoring process, wherein, for a given one of the entities, the distributed scoring process comprises: (i) obtaining information corresponding to a plurality of workloads from a database that is accessible to the other entities, (ii) generating, based on the information, respective scores for at least a portion of the plurality of workloads, and (iii) publishing the generated scores to the database; and selecting, by a centralized scheduler of the container-based computing environment, at least one of the entities to host at least a given one of workloads based at least in part on the generated scores in the database.

20 Claims, 7 Drawing Sheets

(56) References Cited

U.S. PATENT DOCUMENTS

| | | | | |
|---|---|---|---|---|
| 11,489,720 | B1* | 11/2022 | Kempanna | H04L 67/10 |
| 11,928,513 | B1* | 3/2024 | Jiang | G06N 20/20 |
| 12,231,304 | B2* | 2/2025 | Illikkal | G06F 9/5011 |
| 12,250,114 | B2* | 3/2025 | Kempanna | H04L 41/5019 |
| 2013/0111015 | A1* | 5/2013 | Bauchot | G06F 11/3495 |
| | | | | 709/224 |
| 2014/0068053 | A1* | 3/2014 | Ravi | G06F 9/5072 |
| | | | | 709/224 |
| 2014/0137104 | A1* | 5/2014 | Nelson | G06F 9/45558 |
| | | | | 718/1 |
| 2014/0229607 | A1* | 8/2014 | Jung | G06F 9/5072 |
| | | | | 709/224 |
| 2014/0245298 | A1* | 8/2014 | Zhou | G06F 9/45558 |
| | | | | 718/1 |
| 2014/0379889 | A1* | 12/2014 | Faraboschi | H04L 41/0823 |
| | | | | 709/224 |
| 2016/0077860 | A1* | 3/2016 | Machida | G06F 11/16 |
| | | | | 718/1 |
| 2016/0323161 | A1* | 11/2016 | Cuervo Laffaye | H04L 43/08 |
| 2017/0277531 | A1* | 9/2017 | Mcgrath | G06F 11/36 |
| 2018/0176095 | A1* | 6/2018 | Diwakar | H04L 43/08 |
| 2019/0391891 | A1* | 12/2019 | Gupta | G06N 3/043 |
| 2020/0110625 | A1 | 4/2020 | Warnicke et al. | |
| 2020/0133725 | A1* | 4/2020 | Thomas | G06F 9/4893 |
| 2020/0151018 | A1 | 5/2020 | Jha et al. | |
| 2020/0192692 | A1 | 6/2020 | Ghag et al. | |
| 2020/0310847 | A1* | 10/2020 | Schulze | H04L 67/10 |
| 2020/0310852 | A1* | 10/2020 | Featonby | G06F 9/5077 |
| 2020/0371841 | A1* | 11/2020 | Fu | G06F 9/5044 |
| 2020/0409754 | A1* | 12/2020 | Li | G06F 9/4887 |
| 2021/0073028 | A1* | 3/2021 | Li | G06F 9/5011 |
| 2021/0103468 | A1* | 4/2021 | Wang | G06F 9/5044 |
| 2021/0182165 | A1* | 6/2021 | Kammath | G06F 11/3466 |
| 2022/0004427 | A1* | 1/2022 | Savant | G06F 9/44505 |
| 2022/0164327 | A1* | 5/2022 | Zhu | G06F 16/217 |
| 2022/0171652 | A1* | 6/2022 | Zhang | G06F 9/4843 |
| 2022/0337618 | A1* | 10/2022 | Shemer | G06F 9/5027 |
| 2022/0407790 | A1* | 12/2022 | Kempanna | H04L 43/55 |
| 2023/0048653 | A1* | 2/2023 | Tripathi | G06F 8/60 |
| 2023/0118121 | A1* | 4/2023 | Yun | G06F 11/3058 |
| | | | | 718/104 |
| 2023/0124020 | A1* | 4/2023 | Yun | G06F 9/5088 |
| | | | | 718/1 |
| 2023/0129548 | A1* | 4/2023 | Mukherjee | G06F 9/5077 |
| | | | | 718/104 |
| 2023/0266997 | A1* | 8/2023 | Natarajan | G06F 9/505 |
| | | | | 718/104 |

OTHER PUBLICATIONS

Moritz, Philipp, et al., "Ray: A distributed framework for emerging {AI} applications." 13th USENIX Symposium on Operating Systems Design and Implementation (OSDI 18), 2018, pp. 561-577.

Bermbach, David, et al. "Towards auction-based function placement in serverless fog platforms." 2020 IEEE International Conference on Fog Computing (ICFC). IEEE, Apr. 21, 2020, pp. 25-31.

Chen, Ying, et al. "Dynamic service request scheduling for mobile edge computing systems." Wireless Communications and Mobile Computing, vol. 2018, Article ID 1324897, published Sep. 13, 2018.

Tan, Haisheng, et al. "Online job dispatching and scheduling in edge-clouds." IEEE Infocom 2017—IEEE Conference on Computer Communications. IEEE, May 1, 2017, pp. 1-9.

Li, Defang, et al. "Virtual network function placement and resource optimization in NFV and edge computing enabled networks." Computer Networks vol. 152, Apr. 7, 2019, pp. 12-24.

Kubernetes Scheduler, Retrieved from: https://kubernetes.io/docs/concepts/scheduling-eviction/kube-scheduler/, 2021, 2 pages.

* cited by examiner

DISTRIBUTED SCHEDULING IN CONTAINER ORCHESTRATION ENGINES

BACKGROUND

The present application generally relates to information technology and, more particularly, to container orchestration.

Containers generally refer to an executable unit of software in which application code is packaged, along with its libraries and dependencies, so that it can run on multiple types of operating systems. Containers can be run in different scenarios, such as, for example, on-premise, in a public cloud, and/or in a private cloud. A container orchestrator manages multiple containers across a distributed system.

SUMMARY

In one embodiment of the present disclosure, techniques for distributed scheduling in container orchestration engines are provided. An exemplary computer-implemented method includes the steps of configuring a plurality of entities of a container-based computing environment to perform a distributed scoring process, wherein, for a given one of the entities, the distributed scoring process comprises: (i) obtaining information corresponding to a plurality of workloads from a database that is accessible to the other entities, (ii) generating, based on the information, respective scores for at least a portion of the plurality of workloads, and (iii) publishing the generated scores to the database; and selecting, by a centralized scheduler of the container-based computing environment, at least one of the entities to host at least a given one of workloads based at least in part on the generated scores in the database.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Some embodiments of the present disclosure are described with reference to a Kubernetes architecture; however, it is to be appreciated that such techniques are also applicable to other architectures, including other container-based architectures, for example.

A Kubernetes architecture generally includes the following components: an application programming interface (API) server, a scheduler, a controller, an etcd database, and a Kubelet. The API server provides representational state transfer (REST) APIs through which all other components interact. The scheduler watches for newly created pods without an assigned node, and selects a node for them to run on. The term "pod" generally refers to a group of one or more containers, with shared storage and network resources, and a specification for how to run the containers. The controller is responsible for handling different types of actions including, for example, actions related to node failure management, replication of pods, and endpoint management for services. The etcd database corresponds to a key value store, where the API server stores cluster data (for example, data corresponding to cluster state including, but not limited to, include deployments, pods, placement of pods, and/or a node list). A Kubelet is an agent that runs on each node in the cluster and is responsible for fetching the pod-node assignment and creating the assigned pods.

Orchestration engines, such as Kubernetes, leverage a centralized scheduler that selects containers (for example, workloads) sequentially from a queue, filters possible nodes on which a given container can be placed, scores each node, and then selects the node to place the container on based on the scores. Multi-cluster management solutions, such as Red Hat ACM, can leverage placement rules, which define target clusters where a workload can be deployed. The target clusters are evaluated by a central scheduler in the master cluster.

Each of these techniques suffer from one or more of the following disadvantages: the scheduler processes workloads sequentially, thereby negatively impacting scheduling throughput; the central scheduler becomes a bottleneck when a deployment scales to a large number of nodes or a large number of clusters (for example, telephone communication companies often have edge nodes that need to scale to potentially thousands of clusters); and prevents each node or cluster from adopting different policies, filtering, or scoring criteria for hosting workloads. For instance, a node or cluster that has a significantly higher central processing unit (CPU) utilization compared to memory utilization can be assigned a higher score for a pod that is memory intensive in order to balance resource usage, for example. Also, for edge workloads, a cluster that is closer to end users of a workload is assigned a higher score. Different workloads require different criteria to be optimized, for example, in terms of latency, throughput, proximity, availability, and the ability to specify and realize these.

The exemplary embodiments herein describe techniques for distributed scheduling in container orchestration engines that address one or more of the above-referenced issues. For example, some embodiments distribute at least a portion of the scheduling overhead to various nodes and/or clusters. Also, in some embodiments, a node is configured to independently score a subset of workloads it is capable of hosting, and this is done in parallel with other nodes. In some embodiments, each workload specifies its resource requirements and optimization objective (for example, resource balancing, latency and/or proximity). Additionally, each node or cluster can apply local policies, filtering rules, and/or scoring criteria independently of other nodes or clusters to determine the extent to which it can satisfy the requirements of the workload. In such embodiments, a central scheduler can select one or more nodes or clusters (for example, in case of replicas) with the highest scores to host the workload. Accordingly, the central scheduler is not required to separately perform other scheduling tasks (such as, for example, filtering and scoring). In some embodiments, clusters can generate a score to host a particular workload. If the workload is allocated to the cluster, then nodes within the cluster can vote to host the workload.

Generally, a filtering rule can determine which subset of pods are selected by a node to score. By way of example, a node that has a specific hardware accelerator can have a filtering rule that only picks pods that require that specific hardware accelerator. As another example, a filtering rule can be defined to select pods above a certain minimum memory requirement. As used herein a policy generally refers to a guideline. For instance, a policy can be defined so that a node can always select the pod that requires the largest amount of a particular resource (e.g., memory) first, whereas another node can pick pods that require the least amount of a particular resource.

Some embodiments are described in the context of assigning a pod to a node in a single cluster setting, however, those skilled in the art will appreciate that such techniques can also be applied when a workload is assigned to a cluster in a multi-cluster setting.

Figure 1:
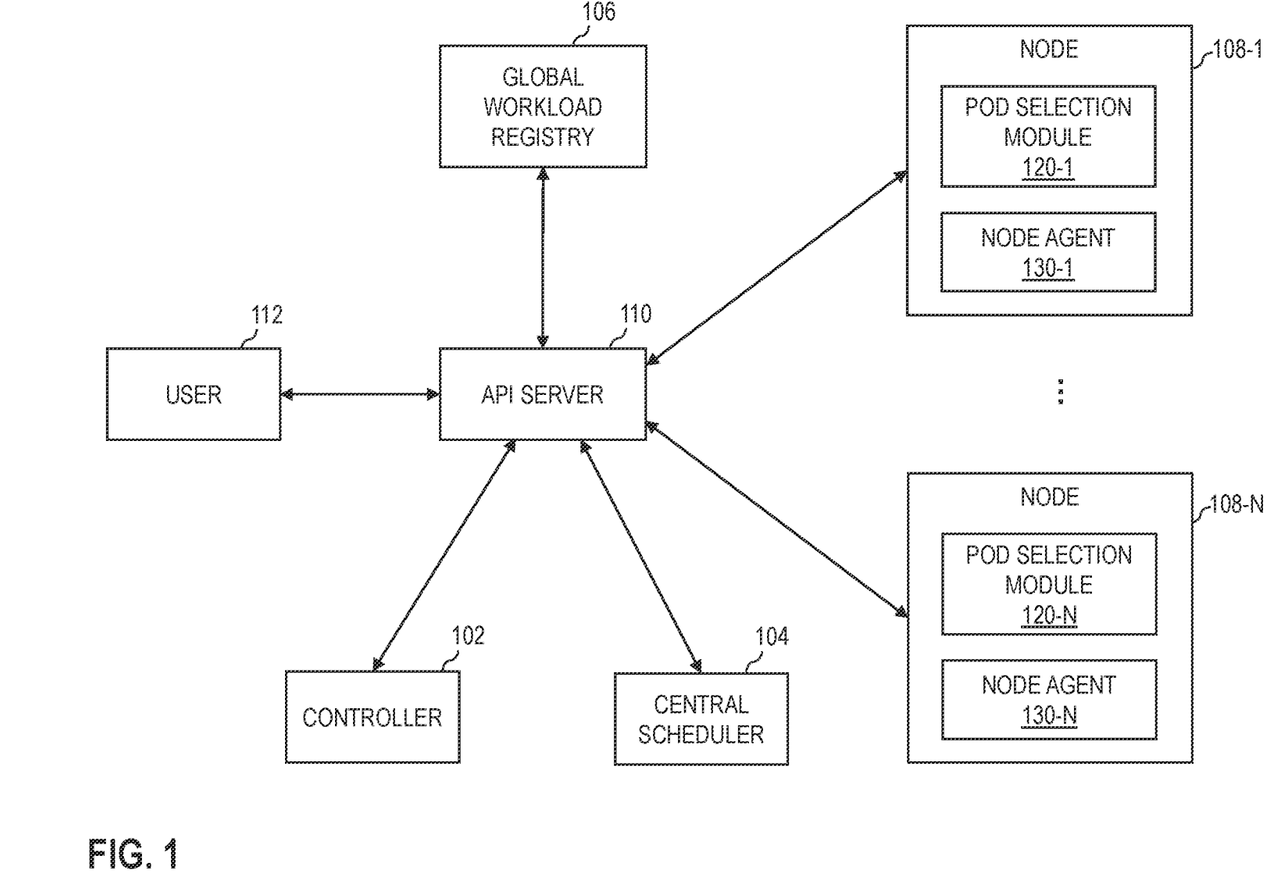
FIG. 1 is a diagram illustrating a system architecture in accordance with exemplary embodiments.

FIG. 1 is a diagram illustrating a system architecture in accordance with exemplary embodiments. FIG. 1 depicts controller 102, a central scheduler 104, a global workload registry 106, a plurality of nodes 108-1, . . . , 108-N (collectively nodes 108), and API server 110, and a user 112. In some examples, the system architecture can correspond to a Kubernetes architecture. Accordingly, the controller 102 and API server 110 can be configured to perform similar functions as described above with reference to the Kubernetes controller and API server. Generally, the global workload registry 106 makes public a list of pods pending to be scheduled, as well as their respective resource requirements and optimization objective, to the nodes 108 via API server 110. In some embodiments, the information of the global workload registry 106 can be stored on a datastore (for example, etcd database).

Each node 108 comprises a corresponding pod selection module 120-1, . . . , 120-N (collectively pod selection modules 120) and a corresponding node agent 130-1, . . . , 130-N (collectively node agents 130). Each of the pod selection modules 120 can leverage locally configured policies, filtering rules and scoring criteria to "vote" for at least a subset of the unscheduled pods listed in the global workload registry 106, and this voting process can be performed in a continuous manner, as described in more detail elsewhere herein. In some embodiments, each vote can correspond to a score by a given one of the nodes 108 with respect to a given pod. The scores for each pod are provided to the global workload registry 106 through the API server 110. An example process that can be performed by a given node 108 utilizing, at least in part, its pod selection module 120 is described in more detail in conjunction with FIG. 2. In at least one embodiment, the score can comprise a combination of a fixed score and a functional score. For example, the functional score can be a function of available resources of a given one of the nodes 108 to permit resource balancing, and the fixed score can be a numerical value based on the extent to which the given node 108 can fulfill the requirements of the pod.

The central scheduler 104 performs a selection process to determine where the pending pods should be placed. An example of a selection process is described in more detail in conjunction with FIG. 3.

The node agents 130 can be implemented as Kubelets, for example. Thus, in some embodiments, a given one of the node agents 130 can retrieve a pod-node assignment that was determined based on the voting process and then create the corresponding pods.

Generally, the user 112 can interact with the API server 110 using a command line interface tool (such as kubectl) to, for example, deploy applications, inspect and manage cluster resources, and view logs.

Figure 2:
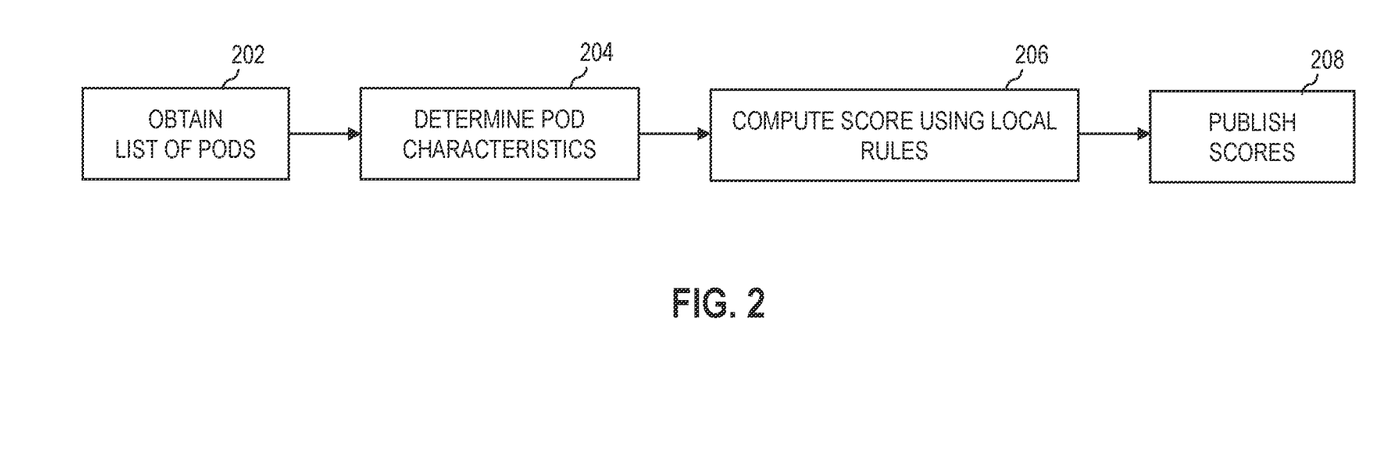
FIG. 2 is a diagram illustrating a local scoring process in accordance with exemplary embodiments.

Referring now to FIG. 2, this figure shows a flow diagram of a local scoring process in accordance with exemplary embodiments. It is assumed that the local scoring process is performed by a given one of the nodes 108 utilizing at least in part its pod selection module 120.

Step 202 includes obtaining a list of pods (for example, from the global workload registry 106). Step 204 includes determining the characteristics associated with the list of pods. For example, the characteristics may include resource requirements and/or an optimization objective (for example, resource balancing, latency, and/or proximity). Step 206 includes computing a score using local rules for each pod. As an example, the local rules may include locally configured policies, filtering rules, and/or scoring criteria. Step 208 includes publishing the scores. For example, the scores can be published via the API server 110 to the global workload registry 106. The scores determined by the process depicted in FIG. 2 can be used to by the central scheduler 104 to place the pods on the nodes using the process depicted in FIG. 3, for example.

Figure 3:
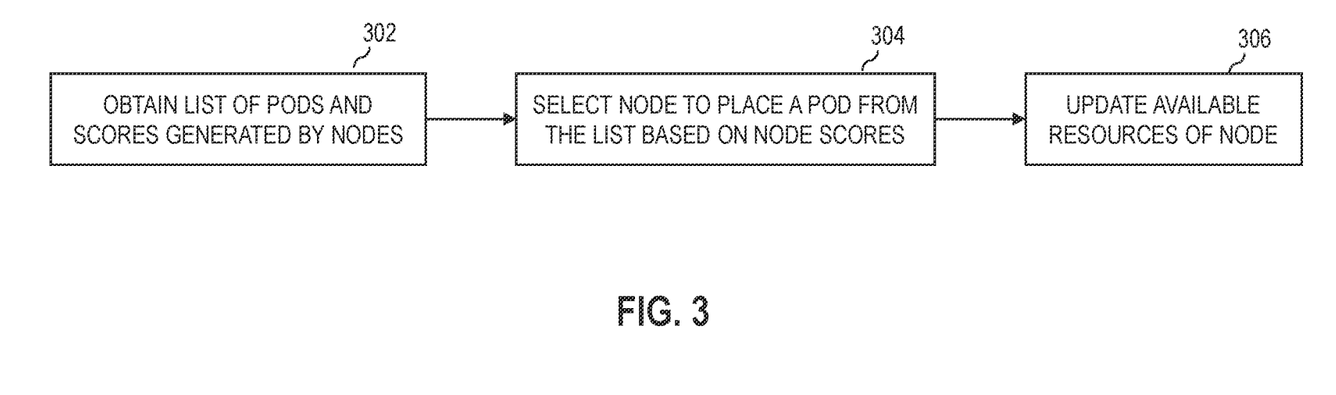
FIG. 3 is a diagram illustrating a placement process in accordance with exemplary embodiments.

Referring now to FIG. 3, this figure shows a flow diagram of a placement process in accordance with exemplary embodiments. In this example it is assumed that the placement process is performed by the central scheduler 104.

Step 302 includes obtaining a list of pods and scores generated by the nodes (for example, according to the process depicted in FIG. 2). Step 304 includes selecting a node to place a given one of the pods based on the node scores. Once a node is selected, step 306 includes updating the available resources of the node. As an example, the central scheduler 104 can consider one pod from the list at a time, determine its functional score component for each node based on the available resources of the node, and then pick the node with the best score to place the pod.

In some embodiments, the score for a given pod can depend on whether another pod is assigned to the node. For example, the score can be a combination of a static score and a functional score of the node. For example, the functional score of the node can be based on the resource availability of the node and can be scored as a function that the central scheduler will evaluate. Also, in at least one embodiment, pods can be scheduled in a group. For example, multiple pods can be grouped together, and each pod in the group assigned to the same node. In one embodiment, a node can obtain a list of pending pods and then submit a score for only a portion of the pods on the list. Accordingly, it is not necessary for all of the nodes to bid on all of the pods.

A node, in some embodiments, can also prevent evicting a pod that it is assigned. For example, before the eviction is triggered, the node can provide information indicating plans to decommission a particular pod, and request another node to host that pod.

As noted herein, the techniques for placing pods on nodes is also applicable for placing workloads on clusters in a multi-cluster environment. As an example, such techniques can be used for edge workloads, which are highly dynamic in nature, require low setup latency (for example, as a network slice in 5G/edge scenarios), have low application latency and/or high throughput, and may need to be dynamically relocated to another edge site if the user is mobile (for example, when the user corresponds to a connected vehicle or self-vehicle). Optimizing workloads in such a manner based on different criteria can be crucial in such situations.

Accordingly, some embodiments described herein allow a distributed scheduling process with each node voting to host a particular workload. Each node is configured to locally apply a set of rules (for example, filters) to generate scores for each workload, which can then be published globally (for example, in etcd). The centralized scheduler then selects one or more nodes (or clusters in case of a multi-cluster environment) to host the workload on based on the votes received for each workload. Additionally, the nodes can include functionality (for example, corresponding to the pod selection modules 120) to prioritize processing requests that have received no, or a limited number of votes (for example, based on a threshold), to improve parallelism, as opposed to every node picking requests in a first in, first out (FIFO) order, for example.

Similar techniques, in some embodiments, can be used for multi-cluster placement to pick the cluster to place a workload on in a multi-cluster environment (such as edge cloud scenarios). In such embodiments, additional constraints can be considered, such as, performance, latency, location of user (also referred to herein as proximity), availability of special hardware or accelerators for the workload in the cluster.

Information on pending requests, in some embodiments, is made globally (for example, to pod selection modules 120), as opposed to just the local scheduler. Accordingly, a given node can determine its score based on the current states of other nodes (or clusters).

The following is an example of pseudocode for implementing at least a portion of a pod selection process in accordance with some embodiments:

1: ScorePods(Node_j)
2: Select k pods that are not scored by Node_j yet
3: For each pod i<=k
4:   Score_{i,j}=0.5*(AvailMem(Node_j)−pod_i_memreq)/TotalMem(Node_j)
  i. +0.5*(AvailCPU(Node_j)−pod_i_cpureq)/TotalCPU(Node_j)
5: Publish Score_{i,j} in global registry AvailMem is the remaining available memory on the node, which can be updated periodically; availCPU is the remaining available CPU resources on the node, which can be updated periodically; TotalMem is the total memory capacity of the node; TotalCPU is the total CPU capacity of the node; pod_i_memreq is the amount of memory resources requested by pod i; and pod_i_cpureq is the amount of CPU resources requested by pod i. Accordingly, it is to be appreciated that the ScorePods function provides higher scores for nodes that are less utilized. In at least one embodiment, the pseudocode corresponds to a software implementation that can be implemented at least in part by each of the pod selection modules 120 of the FIG. 1 embodiment.

It is to be appreciated that this particular example pseudocode shows just one example implementation of a portion of a scoring algorithm, and alternative implementations of the process can be used in other embodiments. As non-limiting examples, other scoring algorithms can be based at least in part on one or more of the following metrics: latency, bandwidth request of pods, available power on node, available hardware accelerators that are suitable for particular types of workloads, and mobility of users requesting the workload (e.g., in Edge use cases in a multi-cluster scenario). It is also to be appreciated that different nodes can use different scoring functions if the scores are provided within the same range (e.g., between 0 and 1).

The following is an example of pseudocode for implementing at least a portion of scheduling process in accordance with some embodiments:

1: SchedulePods:
2: Select next pod i that has been scored by at least N nodes
3: Select node j such that Score_{i,j} is the maximum across all Nodes for pod i
4: Schedule pod i on Node j In at least one embodiment, the pseudocode corresponds to a software implementation that can be implemented at least in part by the central scheduler 104 of the FIG. 1 embodiment. The example pseudocode above can be used in situations where the objective is to reduce scheduling latency by distributing the scheduling overhead for large clusters with dynamic workloads. It is to be appreciated that alternative implementations of the process can be used in other embodiments. By way of example, different selection criteria can be employed by the central scheduler in order to select more globally optimized solutions, which would come at the cost of increased scheduling latency.

Figure 4:
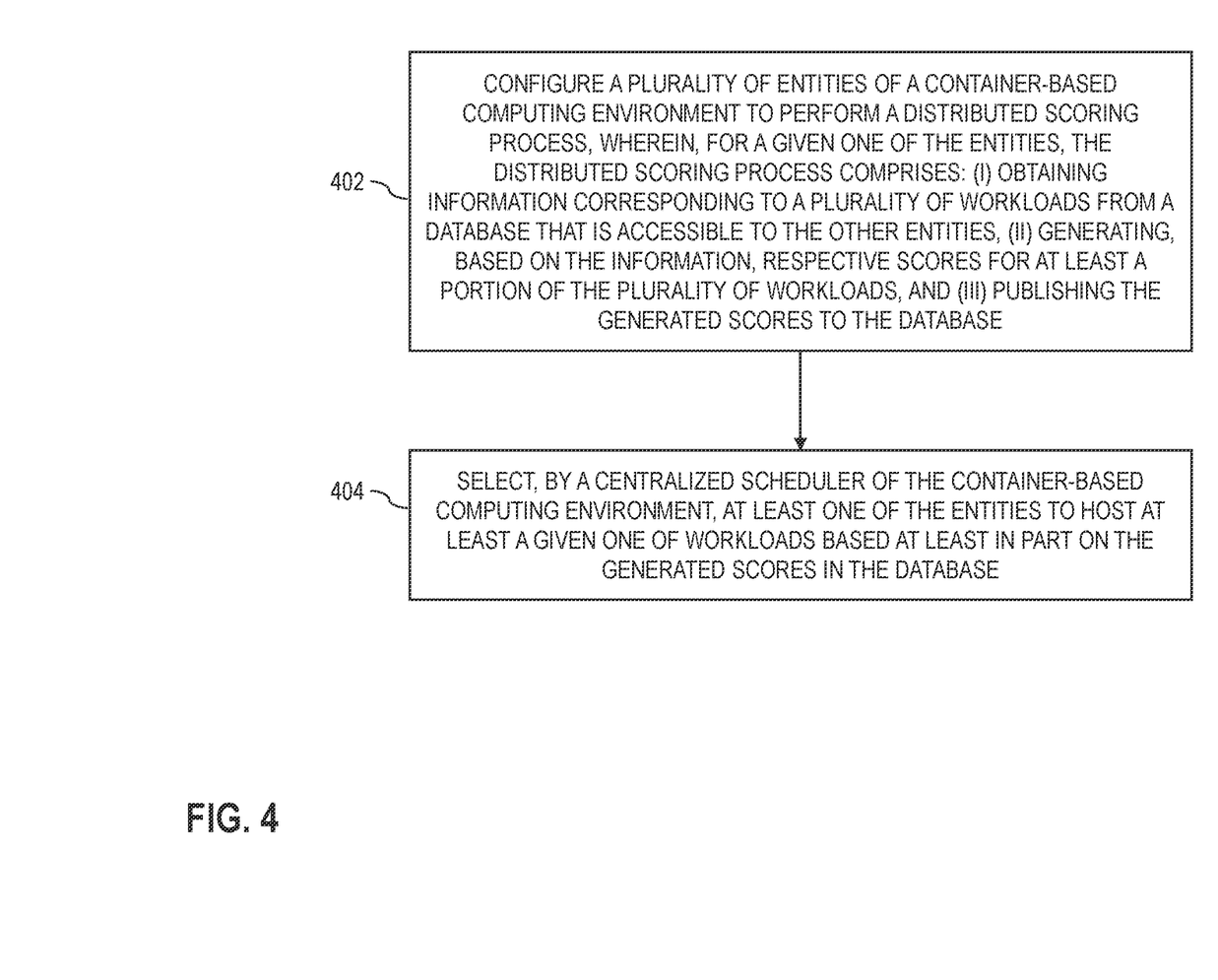
FIG. 4 is a flow diagram illustrating techniques for distributed scheduling in container orchestration engines in accordance with exemplary embodiments.

FIG. 4 is a flow diagram illustrating techniques in accordance with exemplary embodiments. Step 402 includes configuring a plurality of entities of a container-based computing environment to perform a distributed scoring process, wherein, for a given one of the entities, the distributed scoring process comprises: (i) obtaining information corresponding to a plurality of workloads from a database that is accessible to the other entities, (ii) generating, based on the information, respective scores for at least a portion of the plurality of workloads, and (iii) publishing the generated scores to the database. Step 404 includes selecting, by a centralized scheduler of the container-based computing environment, at least one of the entities to host at least a given one of workloads based at least in part on the generated scores in the database.

The information may include at least one of: resource requirements and optimization objectives for the plurality of workloads. The generating may include applying a set of local rules to generate the respective scores. The set of local rules may be different for at least two entities of the plurality of entities. The selecting may be performed based at least in part on resources available at each of the plurality of entities. The process may further include the step of: in response to the selecting, updating the resources available associated with the selected at least one entity. The process may further include the step of creating a group of two or more of the plurality of workloads, wherein the selecting comprises selecting the at least one of the entities to host the group. The respective scores may be generated based at least in part on a number of scores that have been generated by one or more other entities for at least one of the plurality of workloads. The respective scores may be generated based on at least one of: performance metrics associated with one or more of the entities; location of a user with respect to one or more of the entities; and availability of particular hardware at one or more of the entities. The obtained information may include a current state of at least one of the other entities. The plurality of entities may include a plurality of clusters of computing nodes. The process may further include the step of: in response to the centralized scheduler selecting one of the clusters to host at least a given one of workloads, performing a second distributed scoring process among the computing nodes in the selected cluster. The centralized scheduler may perform the selecting for each of the plurality of workloads. The process may further include the step of: executing the plurality of workloads on at least a portion of the plurality of entities in accordance with the selecting.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 5:
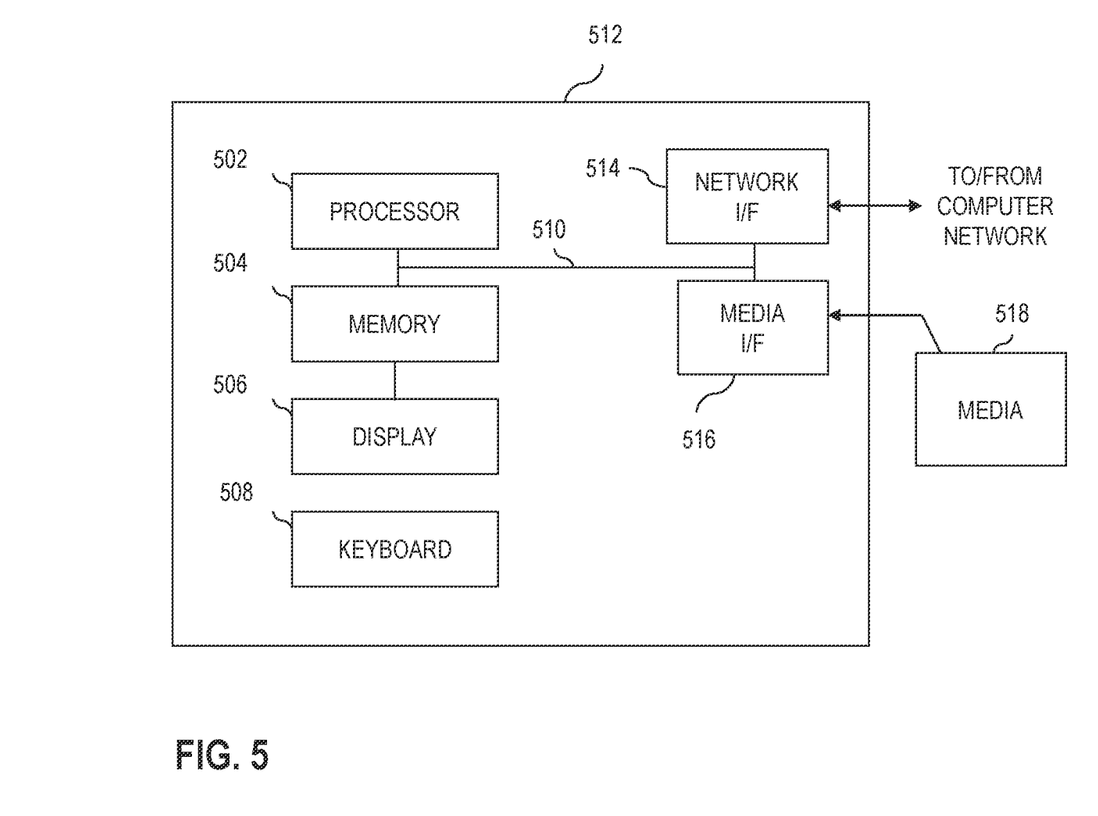
FIG. 5 is a system diagram of an exemplary computer system on which at least one embodiment of the present disclosure can be implemented.

Additionally, an embodiment of the present disclosure can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor.

The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
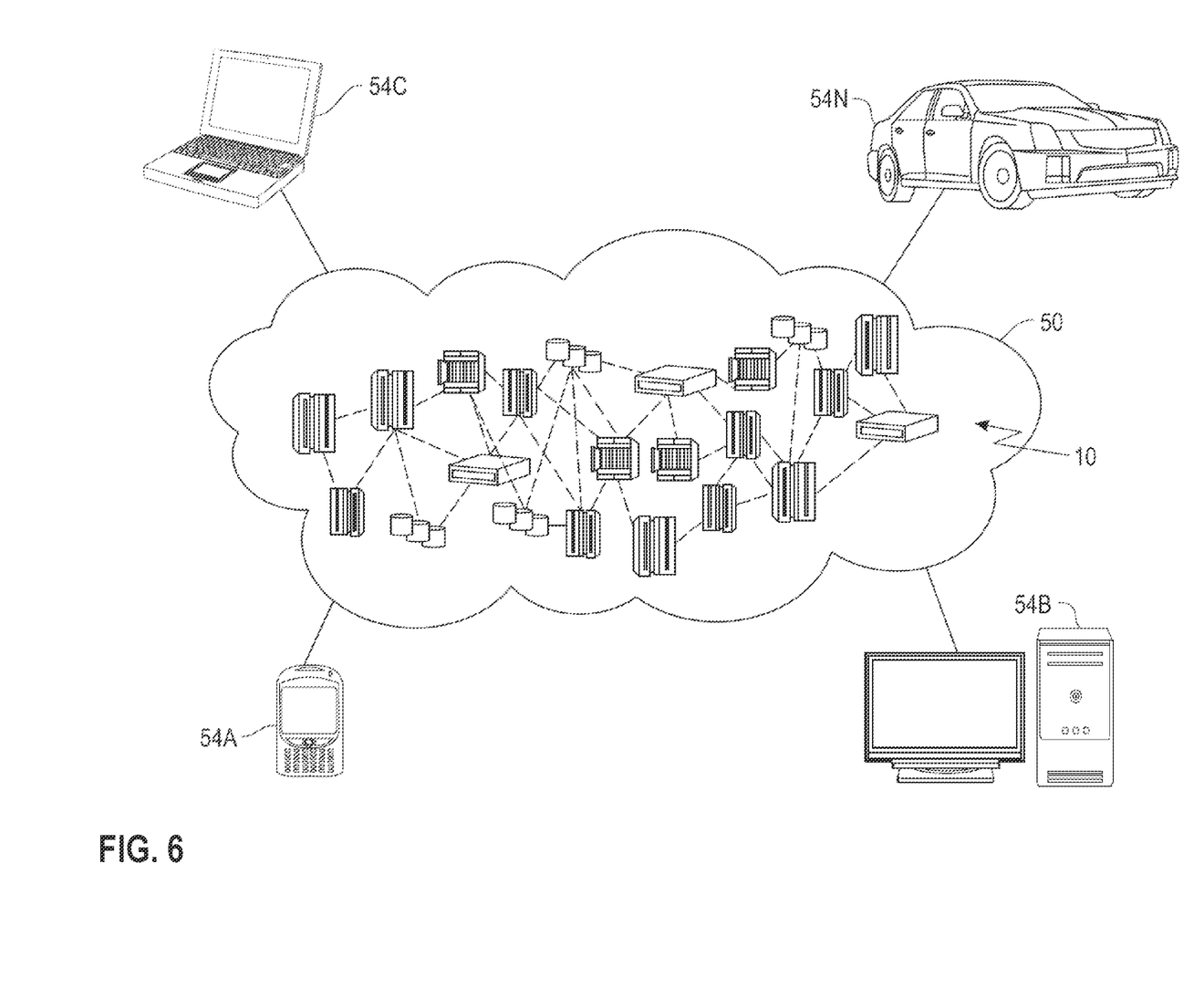
FIG. 6 depicts a cloud computing environment in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (for example, using a web browser).

Figure 7:
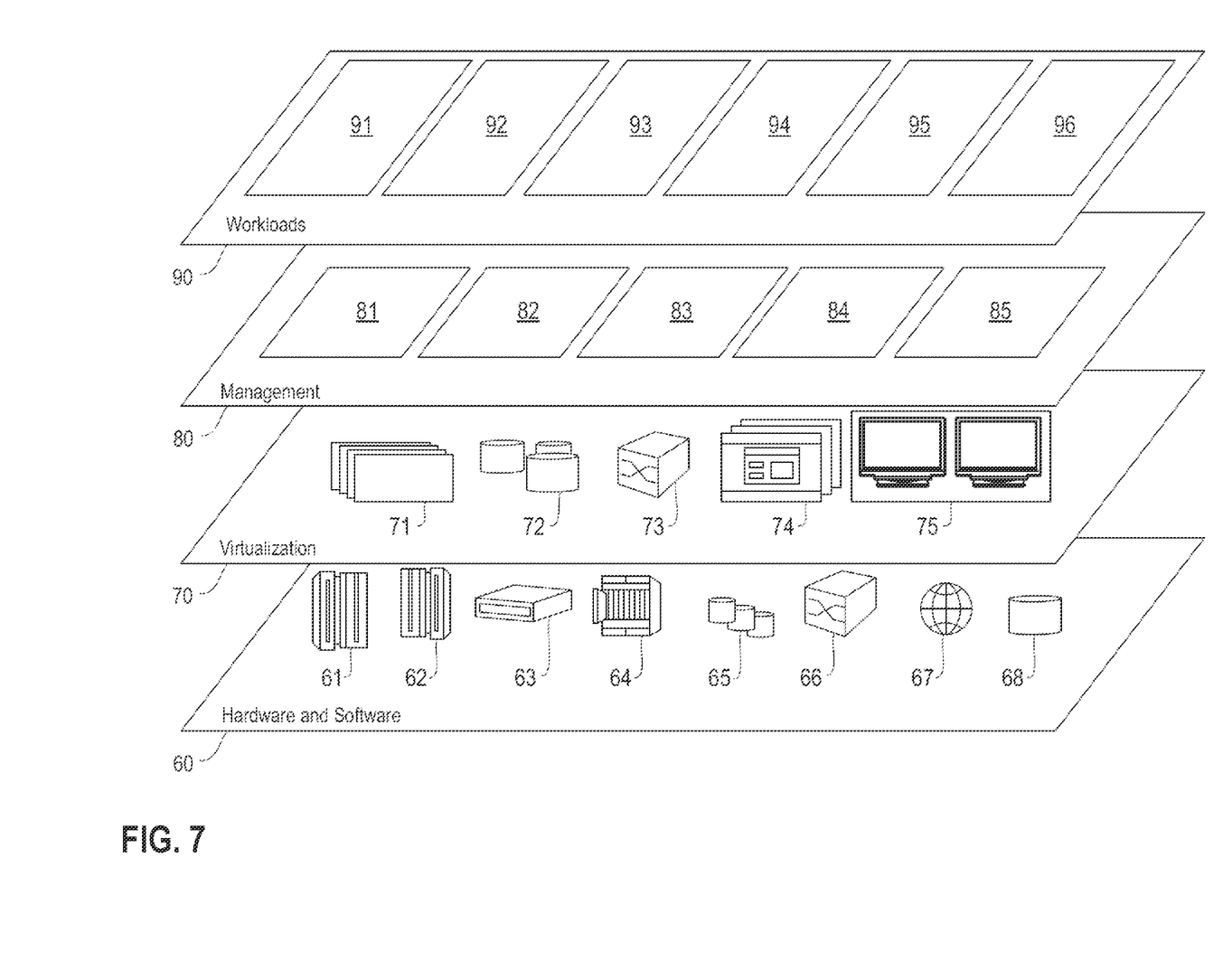
FIG. 7 depicts abstraction model layers in accordance with exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed scheduling 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, allowing scheduling in a container-based environments to be distributed over the nodes, thereby reducing the computation burden of the central scheduler, which often becomes a bottleneck with conventional scheduling techniques, particularly for large-scale deployments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    configuring a plurality of entities of a container-based computing environment to perform a distributed scoring process, wherein, for a given one of the entities, the distributed scoring process comprises: (i) obtaining information corresponding to a plurality of workloads from a database that is accessible to the other entities, (ii) generating, based on the information, respective scores for at least a portion of the plurality of workloads, and (iii) publishing the generated scores to the database;
    selecting, by a centralized scheduler of the container-based computing environment, at least one of the entities to host at least a given one of workloads based at least in part on the generated scores in the database, wherein the centralized scheduler performs the selecting for each of the plurality of workloads; and
    executing the plurality of workloads on at least a portion of the plurality of entities in accordance with the selecting;
    wherein the method is carried out by at least one computing device.

2. The computer-implemented method of claim 1, wherein the information comprises at least one of: resource requirements and optimization objectives for the plurality of workloads.

3. The computer-implemented method of claim 1, wherein the generating comprises applying a set of local rules to generate the respective scores.

4. The computer-implemented method of claim 3, wherein the set of local rules is different for at least two entities of the plurality of entities.

5. The computer-implemented method of claim 1, wherein the selecting is performed based at least in part on resources available at each of the plurality of entities, and wherein the method further comprises:
    in response to the selecting, updating the resources available associated with the selected at least one entity.

6. The computer-implemented method of claim 1, comprising:
    creating a group of two or more of the plurality of workloads, wherein the selecting comprises selecting the at least one of the entities to host the group.

7. The computer-implemented method of claim 1, wherein the respective scores are generated based at least in part on a number of scores that have been generated by one or more other entities for at least one of the plurality of workloads.

8. The computer-implemented method of claim 1, wherein the respective scores are generated based on at least one of:
    performance metrics associated with one or more of the entities;
    location of a user with respect to one or more of the entities; and
    availability of particular hardware at one or more of the entities.

9. The computer-implemented method of claim 1, wherein the obtained information comprises a current state of at least one of the other entities.

10. The computer-implemented method of claim 1, wherein the plurality of entities comprises a plurality of clusters of computing nodes, and wherein the method further comprises:
in response to the centralized scheduler selecting one of the clusters to host at least a given one of workloads, performing a second distributed scoring process among the computing nodes in the selected cluster.

11. A computer program product comprising a computer readable storage medium having program instructions embodied therewith, the program instructions executable by a computing device to cause the computing device to:
configure a plurality of entities of a container-based computing environment to perform a distributed scoring process, wherein, for a given one of the entities, the distributed scoring process comprises: (i) obtaining information corresponding to a plurality of workloads from a database that is accessible to the other entities, (ii) generating, based on the information, respective scores for at least a portion of the plurality of workloads, and (iii) publishing the generated scores to the database;
select, by a centralized scheduler of the container-based computing environment, at least one of the entities to host at least a given one of workloads based at least in part on the generated scores in the database, wherein the centralized scheduler performs the selecting for each of the plurality of workloads; and
execute the plurality of workloads on at least a portion of the plurality of entities in accordance with the selecting.

12. The computer program product of claim 11, wherein the information comprises at least one of: resource requirements and optimization objectives for the plurality of workloads.

13. The computer program product of claim 11, wherein the generating comprises applying a set of local rules to generate the respective scores.

14. The computer program product of claim 13, wherein the set of local rules is different for at least two entities of the plurality of entities.

15. The computer program product of claim 11, wherein the selecting is performed based at least in part on resources available at each of the plurality of entities, and wherein the program instructions cause the computing device to:
in response to the selecting, update the resources available associated with the selected at least one entity.

16. The computer program product of claim 11, wherein the program instructions cause the computing device to:
create a group of two or more of the plurality of workloads, wherein the selecting comprises selecting the at least one of the entities to host the group.

17. A system comprising:
a memory configured to store program instructions;
a processor operatively coupled to the memory to execute the program instructions to:
configure a plurality of entities of a container-based computing environment to perform a distributed scoring process, wherein, for a given one of the entities, the distributed scoring process comprises: (i) obtaining information corresponding to a plurality of workloads from a database that is accessible to the other entities, (ii) generating, based on the information, respective scores for at least a portion of the plurality of workloads, and (iii) publishing the generated scores to the database;
select, by a centralized scheduler of the container-based computing environment, at least one of the entities to host at least a given one of workloads based at least in part on the generated scores in the database, wherein the centralized scheduler performs the selecting for each of the plurality of workloads; and
execute the plurality of workloads on at least a portion of the plurality of entities in accordance with the selecting.

18. The system of claim 17, wherein the information comprises at least one of: resource requirements and optimization objectives for the plurality of workloads.

19. The system of claim 17, wherein the generating comprises applying a set of local rules to generate the respective scores.

20. The system of claim 19, wherein the set of local rules is different for at least two entities of the plurality of entities.

* * * * *